United States Patent [19]
Mahendran et al.

[11] Patent Number: 5,910,250
[45] Date of Patent: Jun. 8, 1999

[54] BAFFLE FOR CONVERSION OF FINE BUBBLES TO COARSE WHILE FILTERING WITH A VERTICAL SKEIN OF HOLLOW FIBERS

[75] Inventors: Mailvaganam Mahendran, Hamilton; Ake Adolf Deutschmann, Mississauga; Wayne Jerald Henshaw, Burlington; Henry Behmann, Puslinch, all of Canada

[73] Assignee: Zenon Environmental Inc., Burlington, Canada

[21] Appl. No.: 08/896,517

[22] Filed: Jun. 16, 1997

Related U.S. Application Data

[63] Continuation-in-part of application No. 08/514,119, Aug. 11, 1995, Pat. No. 5,639,373, and a continuation-in-part of application No. 08/690,045, Jul. 31, 1996, Pat. No. 5,783,083.

[51] Int. Cl.⁶ ............................ B01D 61/00; C02F 1/44
[52] U.S. Cl. .................... 210/636; 210/650; 210/321.69; 210/321.89; 210/321.8; 210/220
[58] Field of Search ............................ 210/500.23, 636, 210/650, 321.69, 356, 321.8, 321.89, 257.2, 220, 258

[56] References Cited

U.S. PATENT DOCUMENTS

| 5,248,424 | 9/1993 | Cote et al. | 210/636 |
| 5,403,479 | 4/1995 | Smith et al. | 210/321.69 |
| 5,607,593 | 3/1997 | Cote et al. | 210/650 |
| 5,639,373 | 6/1997 | Mahendran et al. | 210/636 |
| 5,783,083 | 7/1998 | Henshaw et al. | 210/636 |

*Primary Examiner*—Ana Fortuna
*Attorney, Agent, or Firm*—Alfred D. Lobo

[57] ABSTRACT

A filtration device is provided for withdrawing permeate essentially continuously from a multicomponent aqueous substrate containing growing microorganisms in a reservoir. A vertical skein of fiber is scrubbed with coarse bubbles which emanate from a conversion baffle positioned under the skein. The substrate is aerated with fine bubbles in a size range small enough to transfer oxygen to the substrate efficiently. The baffle traps the fine bubbles and converts them to coarse bubbles which are effective to scrub the fibers. In the most preferred embodiment, the finished headers of the skein are derived from composite headers comprising a fixing lamina of resin in which the fibers are potted near their terminal ends, and a fugitive lamina of fugitive powdery material in which the terminal ends of the fibers are potted. The fugitive lamina is removed, preferably by dissolving the powder, e.g. finely divided common salt in water.

9 Claims, 4 Drawing Sheets

BAFFLE FOR CONVERSION OF FINE BUBBLES TO COARSE WHILE FILTERING WITH A VERTICAL SKEIN OF HOLLOW FIBERS

This application is a continuation-in-part application of Ser. No. 08/514,119 filed August 11, 1995, to be issued as U.S. Pat. No. 5,639,373, and of Ser. No. 08/690,045 filed July 31, 1996; now U.S. Pat. No. 5,783,083.

BACKGROUND OF THE INVENTION

This invention relates to the utilization of bubbles of air in two size ranges, one fine, the other coarse (defined below), to accomplish different functions in the operation of a vertical skein of hollow fiber membranes for filtration of an aqueous medium from a biomass; and to a method of forming a header for potting the ends of the fibers in the vertical skein so as to collect permeate.

The term "vertical skein" in the title (hereafter "skein" for brevity), specifically refers to an integrated combination of structural elements including (i) a multiplicity of vertical fibers of substantially equal length; (ii) a pair of headers in each of which are potted the opposed terminal portions of the fibers so as to leave their ends open; and, (iii) permeate collection means held peripherally in fluid-tight engagement with each header so as to collect permeate from the ends of the fibers.

The term "fibers" is used for brevity, to refer to "hollow fiber membranes" of porous or semipermeable material in the form of a capillary tube or hollow fiber. The term "substrate" refers to a multicomponent liquid feed. A "multicomponent liquid feed" in this art refers, for example, to fruit juices to be clarified or concentrated; wastewater or water containing particulate matter; proteinaceous liquid dairy products such as cheese whey, and the like. The term "particulate matter" is used to refer to micron-sized (from 1 to about 44 $\mu$m) and sub-micron sized (from about 0.1 $\mu$ to 1 $\mu$m) filtrable matter which includes not only particulate inorganic matter, but also dead and live biologically active microorganisms, colloidal dispersions, solutions of large organic molecules such as fulvic acid and humic acid, and oil emulsions.

The term "header" is used to specify a solid body in which one of the terminal end portions of each one of a multiplicity of fibers in the skein, is sealingly secured to preclude substrate from contaminating the permeate in the lumens of the fibers. Typically, a header is a continuous, generally rectangular parallelpiped (prism), or, a cylindrical disk of arbitrary dimensions formed from a natural or synthetic resinous material.

Except for their opposed ends being potted, there is no physical restraint on the fibers of a skein. The term "skein fibers" is used herein to refer to plural arrays. An "array" refers to plural, essentially vertical fibers of substantially equal lengths, the one ends of each of which fibers are closely spaced-apart, either linearly in the transverse (y-axis herein) direction to provide at least one row, and typically plural rows of equidistantly spaced apart fibers. Less preferably, a multiplicity of fibers may be spaced in a random pattern. Typically, plural arrays are potted in a header and enter its face in a generally horizontal x-y plane (see FIG. 3). The width of a rectangular parallelpiped header is measured along the x-axis, and is the relatively shorter dimension of the rectangular upper surface of the header; and, the header's length, which is its relatively longer dimension, is measured along the y-axis.

The parent patent and application teach how to use bubbles to maintain clean fiber surfaces during microfiltration (MF) or ultrafiltration (UF) with a skein. The problem was that coarse bubbles which are most effective for scrubbing fibers are inefficient and uneconomical to provide an oxygen-containing gas (typically air, or air enriched with oxygen, occasionally pure oxygen) required for growth of microorganisms in the aqueous substrate. When furnished as fine bubbles, oxygen is dissolved in the substrate with an efficiency up to 10 times as much as when it is furnished as coarse bubbles. Particularly in large systems for the microfiltration of liquids, the combination of a foraminous conversion baffle and means to channel fine bubbles under the conversion baffle above which the skein is disposed, provides a surprisingly effective and economical solution.

In a vertical skein, all fibers in the plural rows of fibers, rise generally vertically while fixedly held near their opposed terminal portions in a pair of opposed, substantially identical headers to form the skein of substantially parallel, vertical fibers. Typically the opposed ends of a multiplicity of fibers are potted in closely-spaced-apart profusion and bound by potting resin, assuring a fluid-tight circumferential seal around each fiber in the header and presenting a peripheral boundary around the outermost peripheries of the outermost fibers. The position of one fiber relative to another in a skein is not critical, so long as all fibers are substantially codirectional through one face of each header, open ends of the fibers emerge from the opposed other face of each header, and substantially no terminal end portions of fibers are in fiber-to-fiber contact. The vertical skein is not the subject matter of this invention and any prior art vertical skein may be used. Further details relating to the construction and deployment of a most preferred skein are found in the parent U.S. Pat. No. 5,639,373, and in Ser. No. 08/690, 045, the relevant disclosures of each of which are included by reference thereto as if fully set forth herein.

For MF at about ambient pressure, a skein securing at least 10, preferably from 50 to 50,000 fibers, each generally at least 0.5 m long, is disposed within a reservoir of substrate, above the conversion baffle.

The fibers divide a reservoir into a "feed zone" and a withdrawal zone referred to as a "permeate zone"The feed (substrate) is introduced externally (referred to as "outside-in" flow) of the fibers, and resolved into "permeate" and "concentrate" streams. The skein, or a bank of skeins is most preferably used for either MF or UF with "outside-in" flow.

The unique method of forming a header disclosed herein allows one to position a large number of fibers, in closely-spaced apart relationship, randomly relative to one another, or, in a chosen geometric pattern, within each header. It is preferred to position the fibers in arrays before they are potted to ensure that the fibers are spaced apart from each other precisely, and, to avoid wasting space on the face of a header; it is essential, for greatest reliability, that the fibers not be contiguous. By sequentially potting the terminal portions of fibers in stages as described herein, the fibers may be cut to length in an array, either after, or prior to being potted. The use of a razor-sharp knife, or scissors, or other cutting means to do so, does not decrease the open cross-sectional area of the fibers' bores ("lumens"). The solid potting resin forms a circumferential seal around the exterior terminal portions of each of the fibers, open ends of which protrude through the permeate-discharging face of each header, referred to as the "aft" face.

The system disclosed herein is most preferably used to oxygenate mixed liquor in activated sludge, such as is generated in the bioremediation of wastewater. An oxygen-containing gas serves the dual purpose of providing fine bubbles for living microbes as well as coarse bubbles for scrubbing the fibers. Surface portions of the fibers are contacted by successive bubbles as they rise, whether the air is supplied continuously or intermittently, and the fibers are kept "awash in bubbles."

SUMMARY OF THE INVENTION

It has been discovered that very small or "fine" bubbles in a size range from adapted to provide a desirable utilization rate by microorganisms in a substrate, preferably from 0.5 mm to 5 mm, measured within a fine-bubble discharging zone about 10 cm from the gas-discharging surface of a gas-distribution means, may be used to furnish the gas requirements of a live and growing biomass, and then trapped as a mass of gas in a trapping zone between the biomass and a vertical skein disposed directly above the zone. The trapping zone is separated from the vertical skein by a generally horizontal perforated baffle. The perforations in the baffle determine the size of the relatively very large or "coarse" bubbles in a size range effective to scrub outer surfaces of said fibers, preferably from about 10 mm to 50 mm, measured within a coarse-bubble discharging zone about 10 cm from the baffle's gas-discharging surface. Coarse bubbles leave the trapping zone and exit generally parallel to and along the fibers of the vertical skein. The baffle is referred to as a "conversion baffle" because it traps and converts fine bubbles into coarse. Surprisingly, the difficulty of maintaining operation of a fine-bubble generating means in a bioreactor has been effectively dealt with.

It is therefore a general object of this invention to provide a filtration device for the separation of a liquid from a biomass containing live microorganisms requiring a gas, typically oxygen for growth, the device comprising a vertical skein of fibers resting on a conversion baffle disposed within a biomass contacted with fine bubbles of the gas; the conversion baffle has through-openings which allow gas trapped under the baffle to be discharged as coarse bubbles from a discharging zone near the surface of a gas-distribution supply line.

The amount of gas introduced as fine bubbles under a conversion baffle for the benefit of microorganisms in the substrate, is preferably at least enough to generate sufficient coarse bubbles to scrub the fibers and inhibit a build-up of microbes growing on the fibers' surfaces. An excellent flow of permeate is maintained over a long period.

A novel composite header is provided for a bundle of hollow fiber membranes or "fibers", the composite header comprising a molded body of arbitrary shape, having an upper lamina formed from a liquid "fixing" (potting) material which is formed on a lower lamina of a finely divided, pulverulent, solid "fugitive" potting material. The terminal portions of the fibers are first potted in the solid fugitive powdery material which is removed after the composite header is formed. If desired, the composite header may include additional laminae, for example, a "cushioning" lamina overlying the fixing lamina, to cushion each fiber around its embedded outer circumference; and, a "gasketing" lamina to provide a suitable gasketing material against which a permeate collection means may be sealed.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations, like reference numerals refer to like elements, and in which.

DETAILED DESCRIPTION OF PREFERRED EMBODIMENTS

Figure 1:
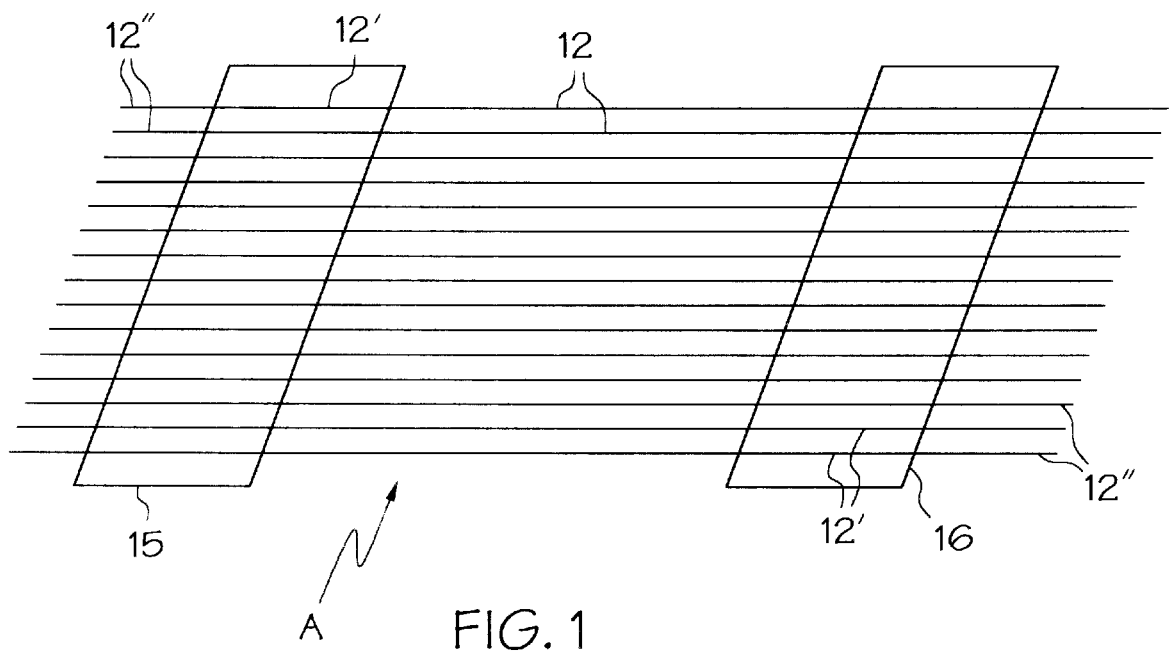
FIG. 1 is a perspective view of a single array, schematically illustrated, of a row of substantially coplanarly disposed parallel fibers secured near their opposed terminal ends between spaced apart cards. Typically, multiple arrays are assembled before being potted.

In the novel method described hereinbelow, the end portions of individual fibers are potted in spaced-apart relationship in a finished header of cured resin, most preferably by "potting" the end portions of fibers sequentially in at least two steps. First, a "fugitive lamina" (so termed because it is removable) is formed with a mass of discrete solid particles. Then, a liquid potting material (referred to as "fixing material") is solidified or cured after it is deposited upon the fugitive lamina. Upon removing the fugitive lamina, what is left is the "finished" or "final" header formed by the second potting material. Of course, less preferably, any prior art method may be used for forming finished headers in which opposed terminal end portions of a fibers in a stack of arrays are secured in proximately spaced-apart relationship with each other.

Permeate may be efficiently withdrawn from a substrate for a surprisingly long period, in a single stage, essentially continuous filtration process, by mounting a pair of headers in vertically spaced apart relationship, one above another, within the substrate which directly contacts a multiplicity of long vertical fibers in a "gas-scrubbed assembly" comprising a skein, a conversion baffle and a gas-distribution means for generating fine bubbles. The skein has a surface area which is at least >1 $m^2$, and opposed spaced-apart ends of the fibers are secured in spaced-apart headers, so that the fibers, when deployed in the substrate, acquire a generally vertical profile therewithin and sway within the bubble zone defined by at least one column of bubbles. The length of fibers between opposed surfaces of headers from which they extend, is preferably in the range from at least 0.1% (per cent) longer than the distance separating those opposed faces, but less than 5% longer.

Typically permeate is withdrawn from the open ends of fibers which protrude from the permeate-discharging aft (upper) face of a header. The overall geometry of potted fibers is determined by a 'fiber-setting form' used to set individual fibers in an array. The skein operates in a substrate held in a reservoir at a pressure in the range for MF, under vacuum of about 6 kPa (1 psi abs) up to 1 atm, and for UF from 1 atm to an elevated pressure up to about 10 atm in a pressurized vessel, optionally in addition with vacuum, without the skein being confined within the shell of a module.

Skein fibers are maintained sufficiently free from particulate deposits with surprisingly little cleansing gas, so that the specific flux at equilibrium is maintained over a long period, typically from 50 hr to 1500 hr, because the skein is immersed so as to present a generally vertical profile, and, the skein is maintained awash in bubbles either continuously or intermittently generated by openings in the conversion baffle. Each header is preferably in the shape of a rectangular parallelpiped, the upper and lower headers having the same transverse (y-axis) dimension, so that plural headers are longitudinally stackable (along the x-axis). A bank of skeins is "gas-scrubbed" with plural openings between adjacent skeins, so that for "n" rectangular headers there are "n+1" rows of openings.

In a typical gas-scrubbed assembly of fibers for liquid filtration, the assembly comprises, (a) bank of gas-scrubbed skeins of fibers which separate a desired permeate from a large body of multicomponent substrate having finely divided particulate matter in the range from 0.1 $\mu$m–44 $\mu$m dispersed therein, (b) each skein comprising at least 20 fibers having upper and lower terminal portions potted spaced-apart from each other, in upper and lower headers, respectively, the fibers being swayable in a bubble zone, (c) a conversion baffle beneath the skeins, and (d) a gas-distribution means adapted to provide a profusion of vertically ascending fine bubbles under the conversion baffle in an amount at least sufficient to provide the needs of the microorganisms. The gas-distribution means also provides gas at a flow rate which is proportional to the number of fibers. The flow rate is generally in the range from 0.47–14 $cm^3$/sec per fiber (0.001–0.03 scfm/fiber) (standard $ft^3$ per minute per fiber), typically in the range from 1.4–4.2 $cm^3$/sec/fiber (0.003–0.009 scfm/fiber). The surface area of the fibers is not used to define the amount of air used because the air travels substantially vertically along the length of each fiber. Fine air bubbles preferably have an average diameter in the range from about 1 mm to about 3 mm, and coarse bubbles have an average diameter in the range from about to 10 mm to about 25 mm.

The number of fibers in an array is arbitrary, typically being in the range from about 1000 to about 10000 for commercial applications, and the preferred surface area for a skein is in the range from 10 $m^2$ to 100 $m^2$. It is most preferred to use a skein made with from 500 to 5000 fibers in the range from 1 m to 3 m long, in combination with a permeate collection means. Typical applications for the system are in microfiltration processes used to remove large organic molecules, emulsified organic liquids and colloidal or suspended solids, usually from water, as for example in a membrane bioreactor, to produce permeate as purified water and recycle biomass. In those instances where a pump is conveniently used, a vacuum pump is unnecessary, adequate driving force being provided by a simple centrifugal pump incapable of inducing a high vacuum, for example of 75 cm Hg on the suction side.

The fibers used to form the skein may be formed of any conventional membrane material provided the fibers are flexible and have an average pore cross sectional diameter for microfilitration, namely in the range from about 1000Å to 10000Å. Preferred fibers operate with a transmembrane pressure differential in the range from 6.9 kPa (1 psi)–69 kPa (10 psi) and are used under ambient pressure with the permeate withdrawn under gravity. The fibers are chosen with a view to perform their desired function, and the dimensions of the skein are determined by the geometry of the headers and length of the fibers. It is unnecessary to confine a skein in a modular shell, and a skein is not.

Preferred fibers are made of organic polymers and ceramics, whether isotropic, or anisotropic, with a thin layer or "skin" on the outside surface of the fibers. Some fibers may be made from braided cotton or polymeric fiber covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein. Preferred ceramic fibers are made from alumina, by E.I. duPont deNemours Co. and disclosed in U.S. Pat. No. 4,069,157.

For hollow fiber membranes, the outside diameter of a fiber is at least 20 $\mu$m and may be as large as about 3 mm, typically being in the range from about 0.1 mm to 2 mm. The larger the outside diameter the less desirable the ratio of surface area per unit volume of fiber. The wall thickness of a fiber is at least 5 $\mu$m and may be as much as 1.2 mm, typically being in the range from about 15% to about 60% of the outside diameter of the fiber, most preferably from 0.5 mm to 1.2 mm.

The fixing material to fix the fibers in a finished header is most preferably either a thermosetting or thermoplastic synthetic resinous material, optionally reinforced with glass fibers, boron or graphite fibers and the like. Thermoplastic materials may be crystalline, such as polyolefins, polyamides (nylon), polycarbonates and the like, semi-crystalline such as polyetherether ketone (PEEK), or substantially amorphous, such as poly(vinyl chloride) (PVC), polyurethane and the like. Thermosetting resins commonly include polyesters, polyacetals, polyethers, cast acrylates, thermosetting polyurethanes and epoxy resins. Most preferred as a "fixing" material (so termed because it fixes the locations of the fibers relative to each other) is one which when cured is substantially rigid in a thickness of about 2 cm, and referred to generically as a "plastic" because of its hardness. Such a plastic has a hardness in the range from about Shore D 50 to Rockwell R 110 and is selected from the group consisting of epoxy resins, phenolics, acrylics, polycarbonate, nylon, polystyrene, polypropylene and ultra-high molecular weight polyethylene (UHMW PE). Polyurethane such as is commercially available under the brand names Adiprene® from Uniroyal Chemical Company and Airthane® from Air Products, and commercially available epoxy resins such as Epon 828 are excellent fixing materials.

The particular method of securing the fibers in each of the headers is not narrowly critical, the choice depending upon the materials of the header and the fiber, and the cost of using a method other than potting. However, it is essential that each of the fibers be secured in fluid-tight relationship within each header to avoid contamination of permeate. This is effected by potting the fibers essentially vertically, in closely-spaced relationship, either linearly in plural equally spaced apart rows across the face of a header in the x-y plane; or alternatively, randomly, in non-linear plural rows. In the latter, the fibers are displaced relative to one another in the lateral direction. Yet another choice is a cylindrical configuration as disclosed in Ser. No. 08/690,045.

It is most preferred to form a composite header in the form of a rectangular prism, which header comprises a "fugitive lamina" of fugitive powder; and a "fixing lamina" formed of non-fugitive fixing liquid. By a "fugitive powder" we refer to a material which is in a size range so small as to form a packed bed which is essentially impermeable to the fixing liquid under ambient atmospheric conditions. The packed bed may be removed after the composite header is formed, by one of several ways depending upon the powder used. If the powder is silica, pumice, or other fluidizable material, it may be shaken or sucked out (under vacuum) of the mold without dissolving the powder. Preferably the powder is either (i) soluble in a medium in which the fibers and fixing material are not soluble, or (ii) fluidizable by virtue of having a melting point (if the material is crystalline) below that which might damage the fibers or fixing material; or, the powder has a glass transition temperature Tg (if the material is non-crystalline), below that which might damage the fibers or material(s) forming the non-fugitive lamina; or (iii) both soluble and fluidizable without being dissolved. Preferred water-soluble powders are common salt (NaCl) or cane or beet sugar; a preferred low melting powder is a low melting wax melting below 80° C.

The powder is poured around terminal portions of fibers forming a bed embedding the fibers at a depth from about 1 cm to about 5 cm in the fugitive lamina and plugging the ends of the fibers. The fibers in the fugitive lamina are then again potted, this time by pouring the fixing liquid over the fugitive lamina.

In greater detail, the method for forming a finished header comprises, forming a stack of at least two superimposed essentially coplanar and similar arrays, each array comprising a chosen number of fibers supported on a support means having a thickness corresponding to a desired lateral spacing between adjacent arrays;

holding the stack in a fugitive powder to embed terminal portions of the fibers in the powder, forming a fugitive lamina, provided that the powder is unreactive with material of the fibers; and, pouring a fixing liquid over the fugitive lamina to embed the fibers to a desired depth, and solidifying the fixing liquid to form a fixing lamina upon the fugitive lamina, the fixing liquid also being substantially unreactive with either the material of the fibers or that of the fugitive lamina;

whereby a composite header is formed in which terminal portions of the fibers are potted, preferably in a geometrically regular pattern, the composite header comprising a laminate of a fugitive lamina of fugitive powder and a contiguous finished header of fixing lamina; and thereafter, removing the fugitive lamina without removing a portion of the fixing lamina so as to leave the ends of the fibers open and protruding from the aft face of the header, the open ends having a generally circular cross-section.

The step-wise procedure for forming an array with the novel header is described with respect to an array illustrated in FIG. 1, as follows:

A desired number of fibers 12 are each cut to about the same length with a sharp blade so as to leave both opposed ends of each fiber with an essentially circular cross-section. The fibers are coplanarly disposed side-by-side in a linear array on a planar support means such as strips or cards 15 and 16. Preferably the strips are coated with an adhesive, e.g. a commercially available polyethylene hot-melt adhesive, so that the fibers are glued to the strips and opposed terminal portions 12" respectively of the fibers, extend beyond the strips. Intermediate portions 12' of the fibers are thus secured on the strips. Alternatively, the strips may be grooved with parallel spaced-apart grooves which snugly accommodate the fibers. The strips may be flexible or rigid. If flexible, strips with fibers adhered thereto, are in turn, also adhered to each other successively so as to form a progressively stiffer stack for a header having a desired geometry of potted fibers. To avoid gluing the strips, a regular pattern of linear rows may be obtained by securing multiple arrays on rigid strips in a stack, with rubber bands 18 or other clamping means. The terminal portions 12" are thus held in spaced-apart relationship, with the center to center distance of adjacent fibers preferably in the range from 1.2 (1.2d) to about 5 times (5d) the outside diameter 'd' of a fiber. Spacing the fibers further apart wastes space and spacing them closer increases the risk of fiber-to-fiber contact near the terminal end portions when the ends are potted. Preferred center-to-center spacing is from about 1.5d to 2d. The thickness of a strip and/or adhesive is sufficient to ensure that the fibers are kept spaced apart. Preferably, the thickness is about the same as, or relatively smaller than the outside diameter of a fiber, preferably from about 0.5d to 1d thick, which becomes the spacing between adjacent outside surfaces of fibers in successive linear arrays.

Having formed a first array, a second array (not shown because it would appear essentially identical to the first) is prepared in a manner analogous to the first; strip 15 of the second array is overlaid upon the intermediate portions 12' on strip 15 of the first array, the strip 15 of the second array resting on the upper surfaces of the fibers secured in strip 15 of the first array. Similarly, strip 16 of the second array is overlaid upon the intermediate portions 12' on strip 16 of the first array.

A third array (essentially identical to the first and second) is prepared in a manner analogous to the first, and then overlaid upon the second, with the strips of the third array resting on the upper surfaces of the fibers of the second array.

Additional arrays are overlaid until the desired number of arrays are stacked in rows forming a set of arrays with the adhesive-coated strips forming the spacing means between successive rows of fibers. The set of arrays is then held vertically to present one stack of strips (the lower stack) to be potted first.

Figure 2:
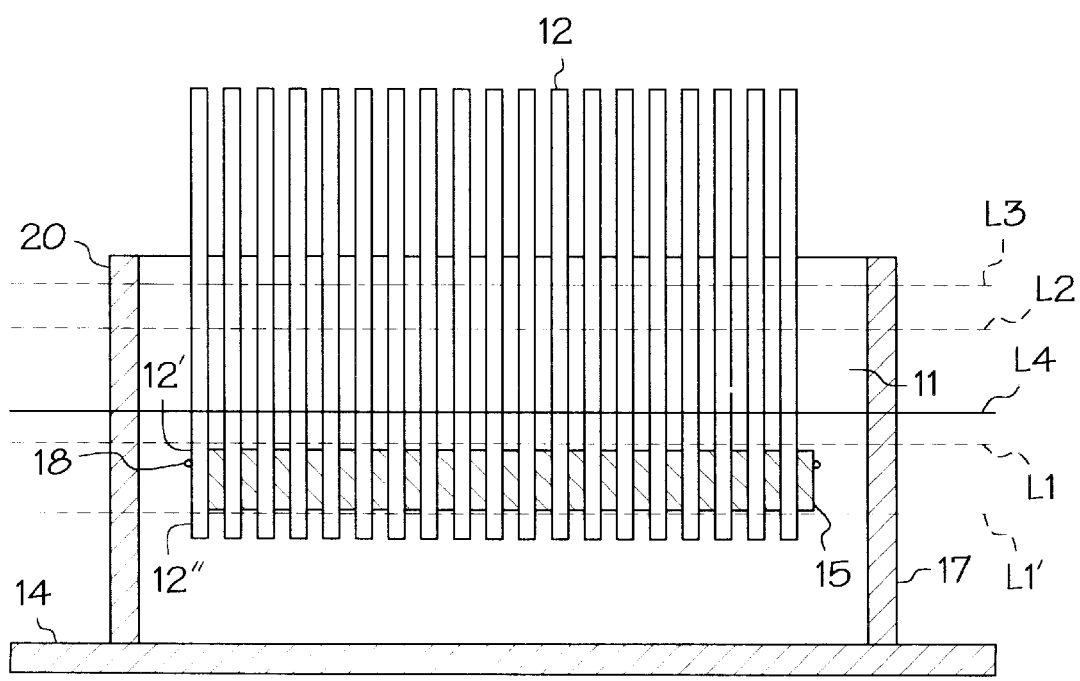
FIG. 2 illustrates a stack of arrays in end view, clamped together, showing that the individual fibers (only the last fiber of each linear array is visible, the remaining fibers in the array being directly behind the last fiber) of each array are separated by the thickness of a strip with adhesive on it, as the stack is held vertically in potting material.

Referring to FIG. 2, there is schematically illustrated a rectangular potting pan 17 the length and width dimensions of which correspond substantially to the longitudinal (x-axis) and transverse (y-axis) dimensions respectively, of the desired header. The lower stack is submerged in a bed of powdered salt having a level indicated by L1, in the pan 17. Most preferred is a liquid wax, preferably a water-soluble wax having a melting point lower than 75° C., such as a polyethylene glycol (PEG) wax.

The depth of the bed of powder will depend upon whether the strips 15 are to be removed from, or left in the finished header.

A. First illustrated is the potting of skein fibers in a upper and lower headers from which the strips will be removed.

(1) A fugitive lamina having a thickness L1 from about 5–10 cm thick (corresponding to the depth of the bed) is formed. The depth of the bed is sufficient to ensure that both the intermediate portions 12' on the strips and terminal portions 12" will be embedded and held spaced apart.

(2) The fixing-liquid, a curable, water-insoluble potting resin, or reactive components thereof, having a viscosity high enough so as not to penetrate the bed of powder sufficiently to plug the ends of the fibers, is poured over the surface of the fugitive lamina to surround the fibers, until the fixing liquid rises to a level L2. It is solidified to form the fixing lamina 11 (which will be the finished header) having a thickness measured from the level L1 to the level L2 (the thickness is written "L1–L2"). The thickness L1–L2 of the fixing lamina, typically from about 1 cm to about 5 cm, is sufficient to maintain the relative positions of the vertical fibers. A first composite header is thus formed having the combined thicknesses of the fugitive and fixing laminae.

(3) In a manner analogous to that described immediately hereinabove, a stack is potted in a second composite header.

(4) The composite headers are demolded from their potting pans and after the salt is shaken out, remaining salt is washed out leaving only the finished headers, each having a thickness L1–L2. The fugitive powder such as salt, may be recovered to be reused.

(5) The adhered strips and terminal portions of the fibers which were embedded within the fugitive lamina are left protruding from the permeate-discharging aft faces of the headers with the ends of the fibers being not only open, but essentially circular in cross section. The fibers may now be cut above the strips to discard them as well as the terminal portions of the fibers adhered to them, yet maintaining the circular open ends. The packing density of fibers, that is, the number of fibers per unit area of header preferably ranges from 4 to 50 fibers/cm$^2$ depending upon the diameters of the fibers.

B. Illustrated second is the potting of skein fibers in upper and lower headers from which the strips will not be removed, to avoid the step of cutting the fibers.

(1) The bed of powder is formed having a level L1' below the cards, to a depth in the range from about 1–2.5 cm, forming fugitive lamina L1'.

(2) The fixing liquid is then poured over the fugitive lamina to depth L2 and solidified, forming a composite header with a fixing lamina having a thickness L1'–L2.

(3) The fugitive lamina is removed and the composite header is demolded leaving the terminal portions 12" protruding from the aft face of the finished header, which aft face is formed at what had been the level L1'. The finished header having a thickness L1'–L2 embeds the strips 15 (along with the rubber bands 18, if used).

C. Illustrated third is the potting of skein fibers to form a finished headers with a cushioning lamina embedding the fibers on the opposed (fore) faces of the headers from which the strips will be removed.

The motion of fibers being scrubbed generates some intermittent 'snapping' motion of the fibers. This motion has been found to break the potted fibers around their circumferences, at the interface of the fore face and substrate. The hardness of the fixing material which forms a "fixing lamina" was found to initiate excessive shearing forces at the circumference of the fiber. The deleterious effects of such forces is minimized by providing a cushioning lamina of material softer than the fixing lamina. Such a cushioning lamina is formed integrally with the fixing lamina, by pouring cushioning liquid (so termed for its function when cured) over the fixing lamina to a depth L3 as shown in FIG. 2, which depth is sufficient to provide enough 'give' around the circumferences of the fibers to minimize the risk of shearing. Such cushioning liquid, when cured is rubbery, having a hardness in the range from about Shore A 30 to Shore D 45, and is preferably a polyurethane or silicone or other rubbery material which will adhere to the fixing lamina. Upon removal of the fugitive lamina, the finished header thus formed has the combined thicknesses of the fixing lamina and the cushioning lamina, namely L1–L3 when the strips 15 are cut away.

D. Illustrated fourth is the formation of a finished header with a gasketing lamina embedding the fibers on the header's aft face, and a cushioning lamina embedding the fibers on the header's fore face; the strips are to be removed.

Figure 3:
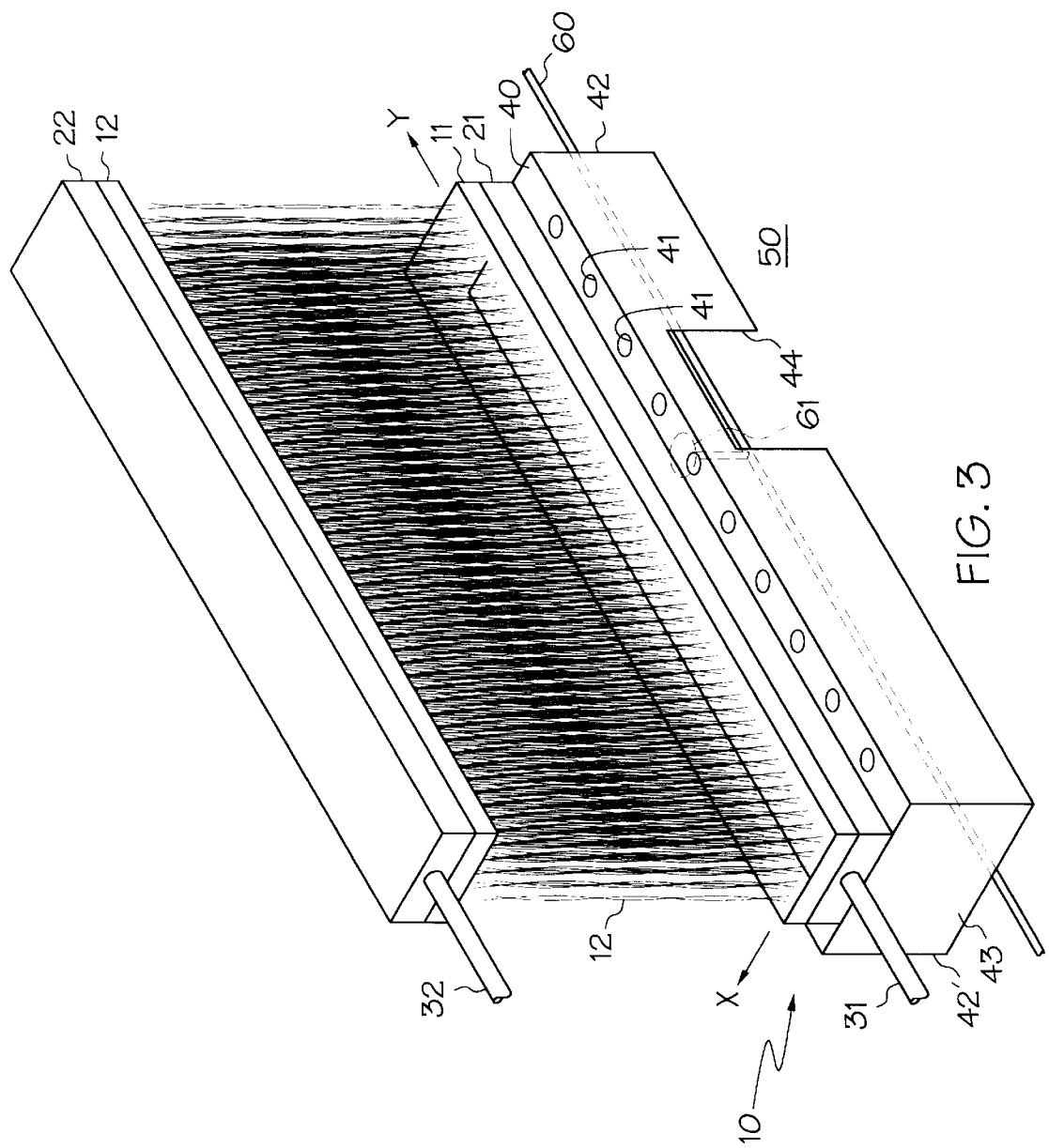
FIG. 3 is a perspective view illustrating a single skein with its integral finished header and permeate collection pan supported on a conversion baffle held between opposed skirts of a shroud.

Whichever finished header is made, it is preferably fitted into a permeate pan 20 as illustrated in FIG. 3 with a peripheral gasket. It has been found that it is easier to seal the pan against a gasketing lamina, than against a peripheral narrow gasket. A relatively soft gasketing material having a hardness in the range from Shore A 40 to Shore D 45, is desirable to form a gasketing lamina integrally with the aft face of the finished header. In the embodiment in which the strips are cut away, the fugitive lamina is formed as before, and a gasketing liquid (so termed because it forms the gasket when cured) is poured over the surface of the fugitive lamina to a depth L4. The gasketing liquid which has a viscosity high enough so as not to penetrate the bed of powder sufficiently to plug the ends of the fibers, is then cured. Upon removal of the fugitive lamina, when the strips 15 are cut away, the finished header thus formed has the combined thicknesses of the gasketing lamina (L1–L4), the fixing lamina (L4–L2) and the cushioning lamina (L2–L3), namely an overall L1–L3.

Referring to FIG. 3, there is shown a skein 10 held between lower and upper headers 11 and 12, having lower and upper permeate collection pans 21 and 22, respectively, sized to snugly accommodate each header 11. The pan is conveniently formed as a rectangular box having a base of substantially the same length and width dimensions as the header to which it is to be fitted. The pan 21 rests on a conversion baffle 40 having perforations 41 along the entire length on each side of the pan so that they extend over a major portion of the perimeter of the header 11; and, a V-shaped trough 46 (see FIG. 4) intermediate the oppositely disposed perforations 41. Preferably the pan 21 is removably secured to the baffle 40 with fastening means. The baffle 40 is held above the floor 50 by opposing sidewalls (or skirts) and preferably the baffle is formed integrally with a box-shaped shroud having opposed sidewalls 42 and 42' and opposed end walls 43, 43' (not visible) to confine the fine bubbles beneath the lower header. The sidewalls are high enough, typically 1 to 2 meters, to allow time for the oxygen in the air to dissolve in the water, and the sidewalls may have one or more openings 44 to facilitate circulation of substrate around the skein fibers 12.

Figure 4:
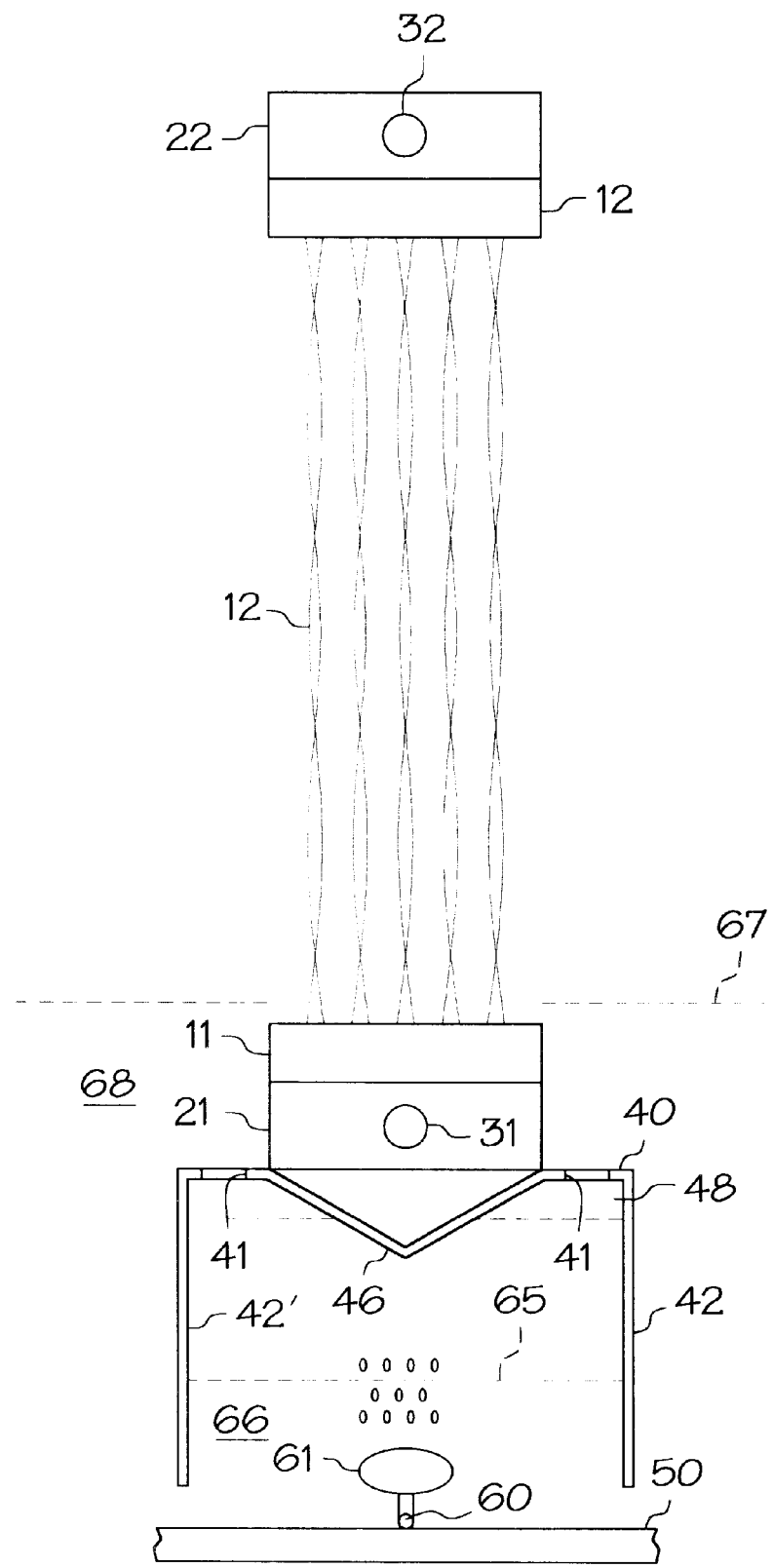
FIG. 4 is a cross-sectional view of the single skein shown in FIG. 3.

Referring further to the elevational cross-section view in FIG. 4, it is seen that within the sidewalls 42, 42' and end walls 43, 43', under the baffle 40 there is inserted an air supply pipe 60 resting on the floor, the pipe fitted with fine-bubble generators 61. The pan 21 rests above the V-shaped trough 46; the zone between the upper surfaces of the fine-bubble generators 61 and a phantom line indicated by reference numeral 65 is referred to as the fine-bubble discharging zone 66 within which the average diameter of the fine bubbles is measured. Upon travelling upwards, the fine bubbles are trapped as a relatively large mass of air in a trapping zone 48 directly below the baffle 40 and above the surface of the substrate, from which trapping zone the air exits through perforations 41 on either side of the header 11 upwardly along the skein fibers. The zone between the upper surface of the baffle 40 and a phantom line indicated by reference numeral 67 is referred to as a coarse-bubble discharging zone 68 within which the average diameter of the coarse bubbles is measured.

Permeate flows from the open ends of the fibers into the pans 21, 22 through permeate withdrawal conduits 31 and 32 which may be positioned in the sides of the pans as illustrated, in open flow communication with the inner portion of the pans. Whether operating under gravity alone, or with a pump to provide additional suction, it will be apparent that a fluid-tight seal is necessary between the peripheries of the headers 11, 12 and the upper portions of the pans 21, 22. Such a seal is obtained by using any conventional means such as a suitable sealing gasket or sealing compound, typically a polyurethane or silicone resin, between the lower peripheries of the headers 11 and the peripheries of the pans. When the skein is backwashed, backwashing fluid flows through the fibers and into the substrate.

It will now be evident that a header with a circular periphery may be constructed, if desired as described in Ser. No. 08/690,045. Headers with geometries having still other peripheries (for example, an ellipse) may be constructed in an analogous manner, if desired, but rectangular headers are most preferred for ease of construction with multiple linear arrays.

In general, the permeate is preferably withdrawn from both the upper and lower headers simultaneously, but may be removed from only the upper or lower header. The skein is operated until the flux declines to so low a level as to require that the fibers be backwashed. The skeins may be backwashed by introducing a backwashing fluid through the upper permeate collection manifold and removing the fluid through the lower manifold, or vice versa. Typically, from 3 to 30 skeins may be coupled together for internal fluid communication with one and another through the headers, permeate withdrawal means and the fibers; all the skeins may be scrubbed concurrently using a common conversion baffle. Since the permeate withdrawal means is also used for backflushing it is generally referred to as a 'liquid circulation means', and as a permeate withdrawal means only when it is used to withdraw permeate.

Figure 5:
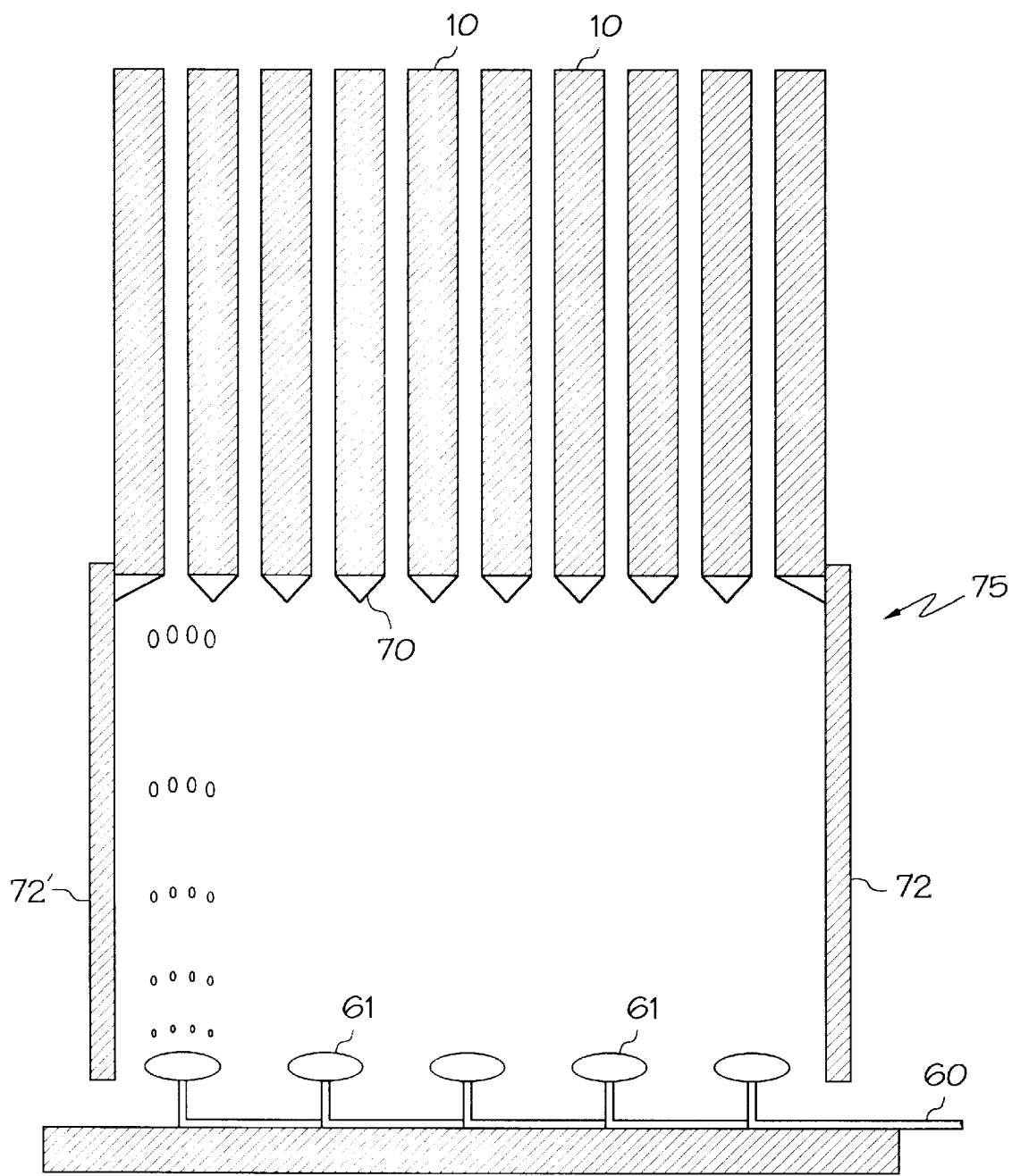
FIG. 5 is a cross-sectional elevational view schematically illustrating multiple skeins, each with an integral finished header and permeate collection pan disposed above a conversion baffle held between opposed skirts of a shroud.

Referring to FIG. 5 there is schematically illustrated a side elevational view of 10 skeins 10 with the lower header of each positioned over a V-shaped trough in a baffle 70. Multiple fine-bubble generators 61 are positioned in longitudinal rows between sidewalls 72, 72' of the shroud indicated generally by 75.

The type of gas (air) manifold is not narrowly critical provided it delivers fine bubbles in the amount necessary for the purpose at hand.

The air may be provided continuously or intermittently, better results generally being obtained with continuous air flow. The amount of air provided depends upon the type of substrate, the requirements of the type of microorganisms, if any, and the susceptibility of the surfaces of the fibers to be plugged, there always being sufficient air to produce desired growth of the microorganisms when operated in a substrate where maintaining such growth is essential.

EXAMPLE 1

An aerobic biochemcial treatment system has a daily capacity of 10,000 cubic meters of sewage with and oxygen demand of 500 mg/L representing a total oxygen demand of 5000 Kg/day. The bioreactor is a rectangular tank 25 meters long, 20 meters wide with a working depth of 6 meters. Microfiltration is carried out with 300 skeins, each 2 meters high and having 50 $m^2$ of surface. Each skein can process 1400 liters/hr using 30 cubic meters/hr of scouring air. All measurements of volume of air are given at standard conditions of 1 atm. and 20° C. at sea level.

The skeins are submerged so that their lower headers are about 2 meters below the surface of the liquid in the bioreactor. The aerators are positioned about 4 meters below the lower header.

The amount of air required to scour (or "air-scrub") all skeins is 216,000 $m^3$/day and this is most effectively accomplished with coarse bubbles.

The transfer efficiency in the bioreactor with coarse bubble aerators is 1% per meter of the depth below the skein that the coarse bubble aerator is positioned. The transfer efficiency with fine bubble aerators is 3% per meter of the depth below the skein that the fine bubble aerator is positioned.

In addition to the air required for scouring, the oxygen demand of the microbes must be supplied with additional air, referred to as "auxiliary air". In a bioreactor fitted with vertical skeins and no conversion baffle, so that all air is supplied as coarse bubbles, the auxiliary air required is 3 times greater than the auxiliary air supplied as fine bubbles (which transfer available oxygen 3 times more efficiently than the coarse bubbles at the same depth). Coarse bubbles are supplied with Aeroflow® stainless steel coarse bubble diffuser, from Aeroflow Environmental Inc. Fine bubbles are supplied with Sanitaire® flexible membrane tube diffusers available from Sannitaire Water Pollution Control Corp. and Elastox® non-clog fine bubble rubber diffusers from Eimco Process Equipment Co. The trapping zone under the conversion baffle is estimated to be narrow, in the range from about 1 cm to about 5 cm in height.

The air requirements for the bioreactor using a conversion baffle and for the same bioreactor using coarse bubbles only, are set forth below, side by side. All volumes of air are set forth in the following Table 1, as standard cubic meters per day.

TABLE 1

| | With Conv. Baffle | Coarse bubbles only |
|---|---|---|
| Air reqd. to scour all skeins | 216,000 | 216,000 |
| Air reqd. to provide oxygen demand | 68,000 | 204,000 |
| Total air reqd. | 284,000 | 420,000 |

It is evident that using a conversion baffle yields a saving of nearly 50% in the cost of supplying air.

In each case permeate is withdrawn through lines connected to the collection pan of each header with a pump generating about 34.5 kPa (5 psi) suction. Permeate is withdrawn at a specific flux of about 0.7 $lm^2h$/kPa yielding about 4.8 l/min of permeate which has an average turbidity of <0.8 NTU, which is a turbidity not discernible to the naked eye.

Having thus provided a general discussion, and specific illustrations of the best mode of constructing and deploying a membrane device with a conversion baffle, and having provided specific illustrations in which using the conversion baffle is compared with not using it, it is to be understood that no undue restrictions are to be imposed by reason of the specific embodiments illustrated and discussed, and particularly that the invention is not restricted to a slavish adherence to the details set forth herein.

We claim:

1. In a filtration device for withdrawing permeate essentially continuously from a multicomponent liquid substrate in a reservoir while increasing the concentration of particulate material therein, said membrane device including: a multiplicity of hollow fiber membranes, or fibers; a first header and a second header disposed in transversely spaced-apart relationship with at least said second header within said substrate; said first header having a terminal end portion of each fiber secured therein, and said second header having an opposed terminal end portion of each fiber secured therein, all said fibers extending from a face of each said header and essentially all said fibers being open at their ends; said fibers being sealingly secured with open ends of the fibers secured in fluid-tight relationship with each other in each of said headers; permeate collection means to collect said permeate, sealingly connected in open fluid communication with a permeate-discharging face of each of said headers; and, means to withdraw said permeate; said fibers, said headers and said permeate collection means together forming a vertical skein wherein said fibers are essentially vertically disposed; said first header being upper and disposed in vertically spaced-apart relationship above said second header, with opposed faces at a fixed distance; each of said fibers having substantially the same length, the improvement comprising, a foraminous conversion baffle removably secured to said second header near the permeate discharging face thereof, said baffle being adapted to trap and discharge gas flowing under said baffle in a vertically upward direction, said baffle having through-openings therein sized to discharge said gas as coarse bubbles in a size range effective to scrub outer surfaces of said fibers.

2. The membrane device of claim 1 wherein said through-openings are adjacent a major portion of said second header's periphery.

3. The membrane device of claim 2 wherein said baffle is disposed between opposed walls adapted to confine said fine bubbles under said baffle, and, to maintain said baffle in vertically spaced-apart relationship with said reservoir's floor.

4. The membrane device of claim 3 wherein said first and second headers are each a rectangular parallelpiped, said first header is disposed parallel to said second header, and said baffle is rectangular and generally coextensive with said second header.

5. The membrane device of claim 4 wherein said fibers are unconfined in a shell of a module, said fibers together haven surface area >1 m$^2$, said fibers are subject to a transmembrane pressure differential in the range from about 0.7 kPa (0.1 psi) to about 345 kPa (50 psi), and each fiber has a length >0.5 meter.

6. In a gas-scrubbed assembly comprising, a filtration membrane device in combination with a gas-distribution means adapted concurrently to provide a growth environment for microorganisms and to minimize build-up of particulate deposits only the surfaces of hollow fiber membranes ("fibers") in said device, and to recover permeate from a multicomponent liquid substrate while leaving particulate matter therein, said membrane device comprising, a multiplicity of fibers secured at opposed ends in first and second headers disposed in spaced-apart relationship within said substrate, all said fibers extending from a face of each said header and essentially all said fibers being open at their ends; said fibers being sealingly secured with open ends thereof secured in fluid-tight relationship with each other in each of said headers; permeate collection means to collect said permeate, sealingly connected in open fluid communication with a permeate-discharging face of each of said headers; means for withdrawing said permeate; and, said gas-distribution means is located within a zone beneath said skein, said gas-distribution means discharges gas to generate enough bubbles flowing in a column of rising bubbles through and around said skein fibers, to keep surfaces of said fibers awash in bubbles; said fibers, said headers and said permeate collection means together forming a skein wherein said fibers are essentially vertically disposed; said first header being upper and disposed in vertically spaced-apart relationship above said second header at a fixed distance; each of said fibers having substantially the same length, the improvement comprising, a foraminous conversion baffle removably secured to said second header at the permeate discharging face thereof, said baffle being adapted to trap and discharge said gas flowing under said baffle in a vertically upward direction, said baffle having through-openings therein sized to discharge said gas as coarse bubbles in a size range effective to scrub outer surfaces of said fibers; and, said gas-distribution means is adapted to discharge fine bubbles directly beneath said baffle in a size range adapted to provide a desirable utilization rate by microorganisms in said substrate;

whereby said permeate is essentially continuously withdrawn while concentration of said particulate matter in said substrate is increased.

7. The gas-scrubbed assembly of claim 6 wherein said fine bubbles are in the size range from about 0.5 mm to about 3 mm in average diameter, measured within a fine-bubble discharge zone about 10 cm from said gas-distribution means' gas-discharging surface.

8. The gas-scrubbed assembly of claim 6 wherein said coarse bubbles are in the size range from about 10 mm to about 50 mm in average diameter, measured within a coarse-bubble discharge zone about 10 cm from said baffle's gas-discharging surface.

9. In a process for maintaining the outer surfaces of hollow fiber membranes of a vertical skein having fibers of substantially the same length secured at opposed ends in first and second headers, essentially free from a build-up of deposits of particulate material while separating a permeate from a multi component liquid substrate having growing microorganisms therein requiring an environment of gas by submerging skein fibers in a reservoir of said substrate, said process comprising, flowing said gas through a gas-distribution means disposed beneath said skein, collecting said permeate in said collection means; and, withdrawing said permeate, the improvement comprising, introducing said gas as fine bubbles, in a size range adapted to provide a desirable utilization rate by microorganism in said substrate, beneath a fine-bubble trapping zone bounded by a foraminous conversion baffle under said second header near the permeate discharging face thereof; and, discharging said gas from said baffle adjacent a major portion of said second header's periphery, as coarse bubbles in a size range effective to scrub outer surfaces of said fibers.

* * * * *